US009827623B2

(12) United States Patent
Gibbons et al.

(10) Patent No.: US 9,827,623 B2
(45) Date of Patent: Nov. 28, 2017

(54) CONTROL OF RECIPROCATION SPEED AND ORBITAL MAGNITUDE OF A JIGSAW WITH A PLURALITY OF MATERIAL AND/OR TASK DESCRIPTIVE ICONS

(75) Inventors: Louis A. Gibbons, Stevensville, MD (US); Michael F. Cannaliato, Bel Air, MD (US); Terry L. Turner, Towson, MD (US); Ruth M. Keffer, Baltimore, MD (US); Weston J. Van Wambeke, Towson, MD (US); John S. Vantran, Parkton, MD (US); Brent A. Kuehne, Red Lion, PA (US)

(73) Assignee: BLACK & DECKER INC., New Britain, CT (US)

( * ) Notice: Subject to any disclaimer, the term of this patent is extended or adjusted under 35 U.S.C. 154(b) by 1675 days.

(21) Appl. No.: 11/859,197

(22) Filed: Sep. 21, 2007

(65) Prior Publication Data

US 2009/0077820 A1 Mar. 26, 2009

(51) Int. Cl.
*B23D 49/16* (2006.01)
*B23D 51/16* (2006.01)

(52) U.S. Cl.
CPC ........... *B23D 49/165* (2013.01); *B23D 51/16* (2013.01); *B23D 49/167* (2013.01); *Y10T 83/04* (2015.04)

(58) Field of Classification Search
CPC .... B23D 49/16; B23D 49/162; B23D 49/165; B23D 49/167; B23D 51/10; B23D 51/16; Y10T 83/7015; Y10T 83/702; Y10T 83/7025; Y10T 83/703; Y10T 83/7035
USPC ............... 30/392–394; 116/309; 83/776–780
See application file for complete search history.

(56) References Cited

U.S. PATENT DOCUMENTS

| 1,102,018 | A | 6/1914 | Dodds |
| 2,377,673 | A | 6/1945 | Chaddock |
| 2,543,486 | A | 2/1951 | Briskin |
| 2,623,557 | A | 12/1952 | Kendall |
| 2,749,951 | A | 6/1956 | Tetzner |
| 2,775,272 | A | 12/1956 | Papworth |
| 2,819,742 | A | 1/1958 | Blachly |
| 2,916,062 | A | 12/1959 | Clauson |
| 2,934,106 | A | 4/1960 | Chapman et al. |

(Continued)

FOREIGN PATENT DOCUMENTS

| DE | 716 266 | 1/1942 |
| DE | 1 760 076 | 1/1958 |

(Continued)

OTHER PUBLICATIONS

Extended European Search Report for European Patent Application No. 08164643.2 dated Mar. 10, 2011 (7 pages).
U.S. Appl. No. 13/230,560, filed Sep. 12, 2011, Louis Gibbons.

*Primary Examiner* — Clark F Dexter
(74) *Attorney, Agent, or Firm* — Stephen R. Valancius

(57) ABSTRACT

A jigsaw generally includes a housing containing a motor activated by a trigger assembly. A single control member is connected to the housing and configured to be accessible by a user. A reciprocating shaft moves at a reciprocation speed and at a magnitude of orbital motion when the trigger assembly is in a retracted condition. The single control member is operable to be positioned among a plurality of positions. Each of the positions corresponds to a predetermined combination of values of the reciprocation speed and the magnitude of the orbital motion.

15 Claims, 13 Drawing Sheets

(56) References Cited

U.S. PATENT DOCUMENTS

| | | | |
|---|---|---|---|
| 3,087,519 A | 4/1963 | McCarty et al. | |
| 3,093,773 A | 6/1963 | Cole | |
| 3,109,465 A | 11/1963 | Smith | |
| 3,116,768 A | 1/1964 | Lasar | |
| 3,131,736 A | 5/1964 | Ristow et al. | |
| 3,146,809 A | 9/1964 | Botefuhr | |
| 3,353,573 A | 11/1967 | Hitzeroth | |
| 3,374,814 A | 3/1968 | Kaufmann | |
| 3,388,728 A | 6/1968 | Riley, Jr. et al. | |
| 3,456,698 A | 7/1969 | Csaki | |
| 3,457,796 A | 7/1969 | Leach et al. | |
| 3,461,732 A * | 8/1969 | Gregory | 74/60 |
| 3,478,786 A | 11/1969 | Hendrickson | |
| 3,542,097 A | 11/1970 | Dudek et al. | |
| 3,805,383 A | 4/1974 | McNally | |
| 3,834,019 A | 9/1974 | Smeltzer et al. | |
| 3,938,251 A | 2/1976 | Kareman | |
| 3,969,796 A | 7/1976 | Hodsdon et al. | |
| 3,973,324 A | 8/1976 | Persson | |
| 4,090,297 A | 5/1978 | Wanner et al. | |
| 4,137,632 A | 2/1979 | Pfanzer | |
| 4,191,917 A | 3/1980 | Brown et al. | |
| 4,213,242 A | 7/1980 | Partington | |
| 4,238,884 A | 12/1980 | Walton, II | |
| 4,240,204 A | 12/1980 | Walton, II et al. | |
| 4,250,624 A | 2/1981 | Partington | |
| 4,255,006 A | 3/1981 | King | |
| 4,255,858 A | 3/1981 | Getts | |
| 4,257,297 A | 3/1981 | Nidbella | |
| 4,262,421 A | 4/1981 | Bergler et al. | |
| 4,272,889 A | 6/1981 | Scott et al. | |
| 4,283,855 A | 8/1981 | Nalley | |
| 4,351,112 A | 9/1982 | Nalley | |
| 4,377,003 A | 3/1983 | Abe et al. | |
| 4,545,123 A | 10/1985 | Hartmann | |
| 4,614,037 A | 9/1986 | Somers | |
| 4,628,459 A | 12/1986 | Shinohara et al. | |
| 4,628,605 A | 12/1986 | Clowers | |
| 4,636,961 A | 1/1987 | Bauer | |
| 4,665,617 A | 5/1987 | Maier et al. | |
| 4,675,999 A | 6/1987 | Ito et al. | |
| 4,693,009 A | 9/1987 | Bone | |
| 4,730,397 A | 3/1988 | Weiford et al. | |
| 4,833,782 A | 5/1989 | Smith | |
| 4,837,935 A | 6/1989 | Maier et al. | |
| 4,932,294 A | 6/1990 | Chang | |
| 4,962,681 A | 10/1990 | Yang | |
| 4,969,830 A | 11/1990 | Daly et al. | |
| 4,973,205 A | 11/1990 | Spaulding | |
| 5,010,652 A | 4/1991 | Miletich | |
| 5,012,583 A | 5/1991 | Blochle et al. | |
| 5,038,481 A | 8/1991 | Smith | |
| 5,119,705 A | 6/1992 | Rosenberger et al. | |
| 5,205,043 A | 4/1993 | Batt et al. | |
| 5,208,525 A | 5/1993 | Lopic et al. | |
| 5,273,462 A | 12/1993 | Huser et al. | |
| 5,279,037 A | 1/1994 | Leatherman | |
| 5,445,479 A | 8/1995 | Hillinger | |
| 5,535,437 A | 7/1996 | Karl et al. | |
| 5,549,145 A | 8/1996 | Bearden | |
| 5,617,638 A | 4/1997 | Amano et al. | |
| 5,644,845 A | 7/1997 | Durr et al. | |
| 5,644,846 A | 7/1997 | Durr et al. | |
| 5,644,847 A | 7/1997 | Odendahl et al. | |
| 5,675,899 A | 10/1997 | Webb | |
| 5,680,704 A | 10/1997 | Okubo et al. | |
| 5,716,730 A | 2/1998 | Deguchi | |
| 5,727,322 A | 3/1998 | Giacometti | |
| 5,778,538 A | 7/1998 | Gentinetta et al. | |
| 5,784,800 A | 7/1998 | Santhouse et al. | |
| 5,813,805 A | 9/1998 | Kopras | |
| D404,274 S | 1/1999 | Ogasawara et al. | |
| 5,902,080 A | 5/1999 | Kopras | |
| 5,996,460 A | 12/1999 | Waite | |
| 6,017,242 A | 1/2000 | Kerrigan | |
| 6,021,826 A | 2/2000 | Daniell | |
| 6,157,545 A | 12/2000 | Janninck et al. | |
| 6,178,646 B1 | 1/2001 | Schnell et al. | |
| 6,189,217 B1 | 2/2001 | Melvin et al. | |
| D440,474 S | 4/2001 | Heun | |
| 6,220,888 B1 | 4/2001 | Correa | |
| 6,230,411 B1 | 5/2001 | Wall et al. | |
| D446,703 S | 8/2001 | Netzler | |
| 6,305,089 B1 | 10/2001 | Berndt | |
| 6,334,743 B1 | 1/2002 | Liao | |
| 6,357,123 B1 | 3/2002 | Manuel | |
| 6,357,124 B1 | 3/2002 | Wall et al. | |
| 6,397,717 B1 | 6/2002 | Waite | |
| 6,412,181 B1 | 7/2002 | Pracas | |
| 6,443,675 B1 | 9/2002 | Kopras et al. | |
| 6,449,851 B1 | 9/2002 | Bone et al. | |
| D463,963 S | 10/2002 | Metaxatos | |
| 6,484,409 B2 | 11/2002 | Campbell et al. | |
| 6,510,772 B2 | 1/2003 | Brickner, Jr. et al. | |
| 6,553,642 B2 | 4/2003 | Driessen | |
| 6,553,675 B2 | 4/2003 | Orrico | |
| D474,384 S | 5/2003 | Andriolo | |
| D476,871 S | 7/2003 | Santarsiero et al. | |
| 6,625,892 B2 | 9/2003 | Takahashi et al. | |
| D486,711 S | 2/2004 | Tam et al. | |
| 6,691,417 B2 | 2/2004 | Campbell et al. | |
| 6,705,017 B2 | 3/2004 | Ellis et al. | |
| D489,239 S | 5/2004 | Keller | |
| 6,755,107 B2 | 6/2004 | Peot et al. | |
| 6,769,188 B2 | 8/2004 | Dorner et al. | |
| 6,877,234 B2 | 4/2005 | Saegesser et al. | |
| 6,879,863 B2 * | 4/2005 | Mueller et al. | 700/85 |
| 6,890,135 B2 | 5/2005 | Kopras et al. | |
| 6,892,459 B2 | 5/2005 | Okumura et al. | |
| 6,902,356 B2 | 6/2005 | Breitenmoser | |
| 6,912,788 B2 | 7/2005 | Tam et al. | |
| 6,920,694 B2 | 7/2005 | Hecht et al. | |
| D519,014 S | 4/2006 | Aglassinger | |
| D519,346 S | 4/2006 | Wu | |
| D519,804 S | 5/2006 | Wu | |
| D519,805 S | 5/2006 | Ng | |
| D519,806 S | 5/2006 | Waldron | |
| D520,318 S | 5/2006 | Waldron | |
| D521,335 S | 5/2006 | Parel et al. | |
| D521,834 S | 5/2006 | Andriolo et al. | |
| D522,335 S | 6/2006 | Houghton | |
| D523,309 S | 6/2006 | Schmid | |
| D523,311 S | 6/2006 | Welsh et al. | |
| 7,065,884 B2 | 6/2006 | Tam et al. | |
| D524,621 S | 7/2006 | Wu | |
| D524,622 S | 7/2006 | Corcoran | |
| D525,098 S | 7/2006 | Taniguchi et al. | |
| 7,094,011 B2 | 8/2006 | Kopras et al. | |
| 7,111,405 B2 | 9/2006 | Delfini et al. | |
| D532,664 S | 11/2006 | Wu | |
| 7,131,180 B2 | 11/2006 | Kopras et al. | |
| 7,131,206 B2 | 11/2006 | Wu | |
| 7,152,329 B2 | 12/2006 | Kondo et al. | |
| 7,234,243 B2 | 6/2007 | Tam et al. | |
| D560,455 S | 1/2008 | Yamamoto et al. | |
| 7,328,514 B2 | 2/2008 | Park | |
| D566,504 S | 4/2008 | Hayakawa et al. | |
| D572,555 S | 7/2008 | Baumgaertner | |
| 7,503,121 B2 | 3/2009 | Powell et al. | |
| 7,509,744 B2 * | 3/2009 | Walker | 30/393 |
| 7,513,047 B2 | 4/2009 | Wu | |
| 7,526,867 B2 | 5/2009 | Park | |
| 7,562,457 B2 | 7/2009 | Prieto | |
| 2002/0131267 A1 | 9/2002 | Van Osenbruggen | |
| 2002/0197123 A1 | 12/2002 | Kopras et al. | |
| 2003/0000355 A1 | 1/2003 | Butler et al. | |
| 2003/0121389 A1 | 7/2003 | Wheeler et al. | |
| 2003/0145472 A1 | 8/2003 | Swift | |
| 2003/0167641 A1 | 9/2003 | Teng | |
| 2003/0196338 A1 | 10/2003 | Eto et al. | |
| 2003/0233921 A1 | 12/2003 | Garcia et al. | |
| 2004/0040161 A1 | 3/2004 | Houben et al. | |
| 2004/0049927 A1 | 3/2004 | Wu | |
| 2004/0112187 A1 | 6/2004 | Chen et al. | |

(56) References Cited

U.S. PATENT DOCUMENTS

| | | |
|---|---|---|
| 2004/0128843 A1 | 7/2004 | Walker |
| 2004/0168561 A1 | 9/2004 | Tam et al. |
| 2004/0261274 A1 | 12/2004 | Tam et al. |
| 2005/0060896 A1 | 3/2005 | Park |
| 2005/0195592 A1 | 9/2005 | Hsu et al. |
| 2005/0217448 A1 | 10/2005 | Walker |
| 2005/0223571 A1 | 10/2005 | Park et al. |
| 2005/0229408 A1 | 10/2005 | Ngan et al. |
| 2005/0252007 A1 | 11/2005 | Critelli et al. |
| 2005/0257383 A1 | 11/2005 | Million |
| 2005/0257384 A1 | 11/2005 | Million |
| 2005/0257385 A1 | 11/2005 | Walker |
| 2005/0262707 A1 | 12/2005 | Wu |
| 2005/0283984 A1 | 12/2005 | Walmsley |
| 2006/0064882 A1 | 3/2006 | Wilson et al. |
| 2006/0080850 A1 | 4/2006 | Firth |
| 2006/0090355 A1 | 5/2006 | Di Nicolantonio |
| 2006/0101969 A1 | 5/2006 | Garcia et al. |
| 2006/0104732 A1 | 5/2006 | Huang |
| 2006/0117580 A1 | 6/2006 | Serdynski et al. |
| 2006/0143928 A1 | 7/2006 | Wu |
| 2006/0168824 A1 | 8/2006 | Roberts |
| 2006/0185173 A1 | 8/2006 | Wadge et al. |
| 2006/0191140 A1 | 8/2006 | Wadge et al. |
| 2006/0196059 A1 | 9/2006 | Berto |
| 2006/0288592 A1 | 12/2006 | Roberts |
| 2007/0059114 A1 | 3/2007 | Grimes |
| 2007/0068012 A1 | 3/2007 | Chen |
| 2007/0101586 A1 | 5/2007 | Felder et al. |
| 2007/0180711 A1 | 8/2007 | Park |
| 2007/0186425 A1* | 8/2007 | Tam et al. ................. 30/392 |
| 2007/0289148 A1 | 12/2007 | Zhang et al. |
| 2008/0222901 A1 | 9/2008 | Kaiser et al. |
| 2008/0229589 A1 | 9/2008 | Bone |
| 2008/0244910 A1 | 10/2008 | Patel |
| 2009/0313831 A1 | 12/2009 | Patel |

FOREIGN PATENT DOCUMENTS

| | | |
|---|---|---|
| DE | 1 795 934 | 9/1959 |
| DE | 1 628 899 | 8/1971 |
| DE | 23 03 532 | 8/1974 |
| DE | 24 35 845 | 2/1976 |
| DE | 26 50 470 | 5/1978 |
| DE | 80 33 115 | 5/1981 |
| DE | 30 21 801 | 12/1981 |
| DE | 31 18758 | 12/1982 |
| DE | 32 22 426 | 12/1983 |
| DE | 3403762 A1 | 8/1985 |
| DE | 34 08 847 | 11/1985 |
| DE | 34 46 278 | 6/1986 |
| DE | 35 43 764 | 6/1986 |
| DE | 35 09 515 | 9/1986 |
| DE | 8507818 U1 | 2/1987 |
| DE | 36 08 301 | 9/1987 |
| DE | 88 08 046 U1 | 10/1988 |
| DE | 35 46 547 | 5/1989 |
| DE | 3906643 A1 | 9/1990 |
| DE | 35 46 700 | 10/1990 |
| DE | 39 21 891 | 1/1991 |
| DE | 40 27 135 | 3/1992 |
| DE | 93 07 337 | 8/1993 |
| DE | 9313712 U1 | 12/1993 |
| DE | 43 20 233 | 6/1994 |
| DE | 43 16 155 | 11/1994 |
| DE | 195 13 078 | 10/1996 |
| DE | 196 04 938 | 2/1997 |
| DE | 296 15 634 U | 4/1997 |
| DE | 196 09 388 | 9/1997 |
| DE | 29910173 U1 | 9/1999 |
| DE | 199 26 387 | 12/2000 |
| DE | 201 20 529 U | 4/2002 |
| DE | 102 15 871 | 10/2003 |
| DE | 202 20 893 U | 6/2004 |
| DE | 10 2004 042 025 | 3/2006 |
| DE | 102004043 564 | 3/2006 |
| DE | 102004051 350 | 4/2006 |
| DE | 20 2006 004 715 U | 6/2006 |
| DE | 102004 063 174 | 7/2006 |
| DE | 102005025 934 | 12/2006 |
| DE | 102006005410 A1 | 8/2007 |
| EP | 0 347 631 | 12/1989 |
| EP | 0 504 745 | 9/1992 |
| EP | G 0 521 263 | 1/1993 |
| EP | 0 603 552 | 6/1994 |
| EP | 0 716 897 | 6/1996 |
| EP | 0 716 898 | 6/1996 |
| EP | 0 736 353 | 10/1996 |
| EP | 0 826 453 | 3/1998 |
| EP | 0 967 040 B1 | 12/1999 |
| EP | 0 970 771 | 1/2000 |
| EP | 1 188 505 | 3/2002 |
| EP | 1 328 369 | 4/2002 |
| EP | 1 258 305 | 11/2002 |
| EP | 1 001 866 B1 | 3/2004 |
| EP | 1 586 399 | 10/2005 |
| EP | 1 658 936 | 5/2006 |
| EP | 1 679 144 | 7/2006 |
| EP | 1 437 203 B1 | 12/2006 |
| EP | 1 595 631 B1 | 2/2007 |
| GB | 221671 A | 9/1924 |
| GB | 2075421 A | 11/1981 |
| GB | 2300145 A | 10/1996 |
| GB | 2 310 905 | 9/1997 |
| GB | 2 330 328 | 4/1999 |
| GB | 2 336 805 | 11/1999 |
| GB | 2 337 228 | 11/1999 |
| GB | 2 399 314 | 9/2004 |
| GB | 2 399 315 | 9/2004 |
| GB | 2 406 071 | 3/2005 |
| JP | 2000 343309 | 12/2000 |
| JP | 2002 337102 | 11/2002 |
| WO | WO 8605427 | 9/1986 |
| WO | WO-9902310 A2 | 1/1999 |
| WO | WO 02/22297 | 3/2002 |
| WO | WO-0232608 A1 | 4/2002 |
| WO | WO/02/057042 | 7/2002 |
| WO | WO 03/106087 | 12/2003 |

\* cited by examiner

CONTROL OF RECIPROCATION SPEED AND ORBITAL MAGNITUDE OF A JIGSAW WITH A PLURALITY OF MATERIAL AND/OR TASK DESCRIPTIVE ICONS

FIELD

The present teachings relate to jigsaw and more particularly relate to control of reciprocation speed and a magnitude of orbital (pendulum) motion of a reciprocating shaft of a jigsaw with a single control member.

BACKGROUND

Typically, control of reciprocation speed and control of a magnitude of orbital motion of a cutting blade of a jigsaw are relegated to two separate respective controls. A user wishing to set the reciprocation speed and the magnitude of orbital motion for a specific application is required to individually, determine, adjust and match values of the reciprocation speed and the magnitude of orbital motion for various materials or tasks for which the jigsaw is being used.

SUMMARY

The present teachings generally include a jigsaw having a housing containing a motor activated by a trigger assembly. A single control member is connected to the housing and configured to be accessible by a user. A reciprocating shaft moves at a reciprocation speed and at a magnitude of orbital motion when the trigger assembly is in a retracted condition. The single control member is operable to be positioned among a plurality of positions. Each of the positions corresponds to a predetermined combination of values of the reciprocation speed and the magnitude of orbital motion.

Further areas of applicability will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Figure 11:
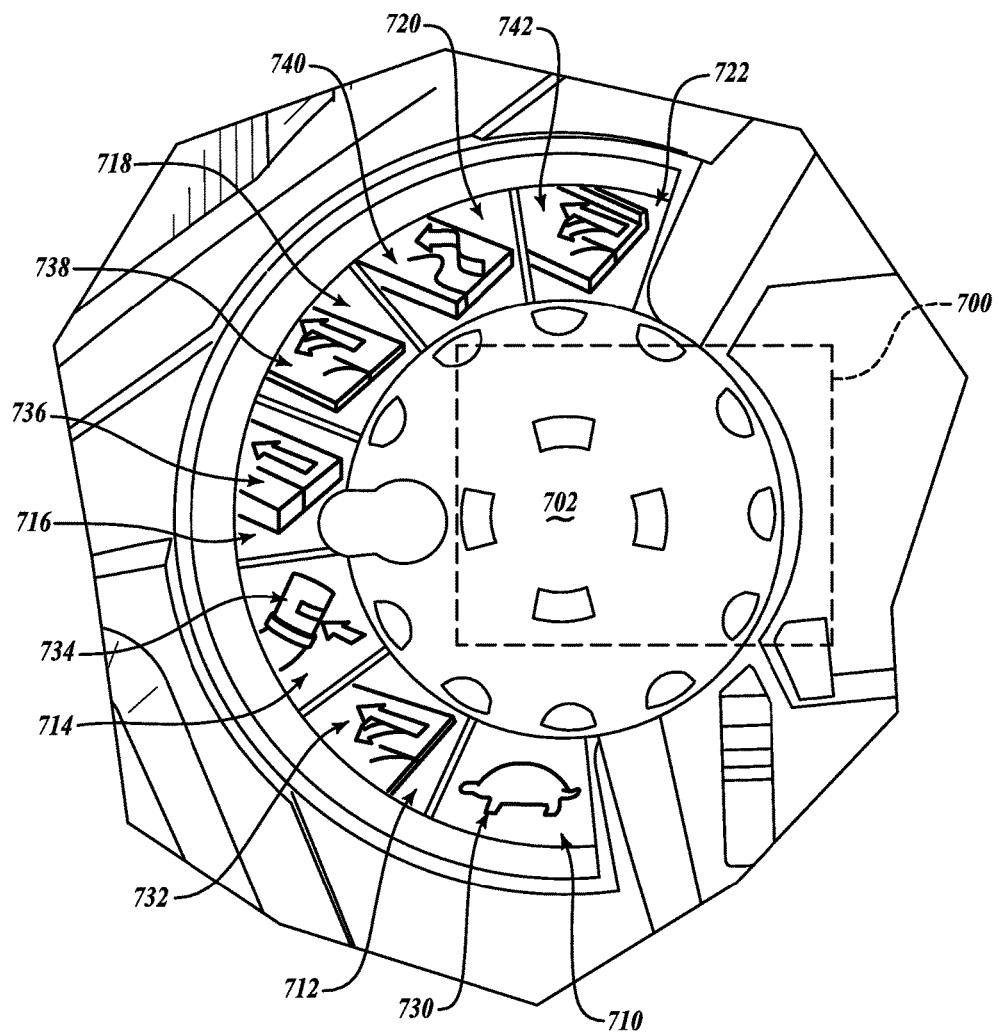
FIG. 11 is a partial side view of an exemplary portion of a housing of a jigsaw showing a plurality of icons attached to a fascia adjacent to a single control member that each indicates a combination of reciprocation speed and magnitude of orbital motion for specific tasks and/or materials in accordance with the present teachings.
Figure 12:
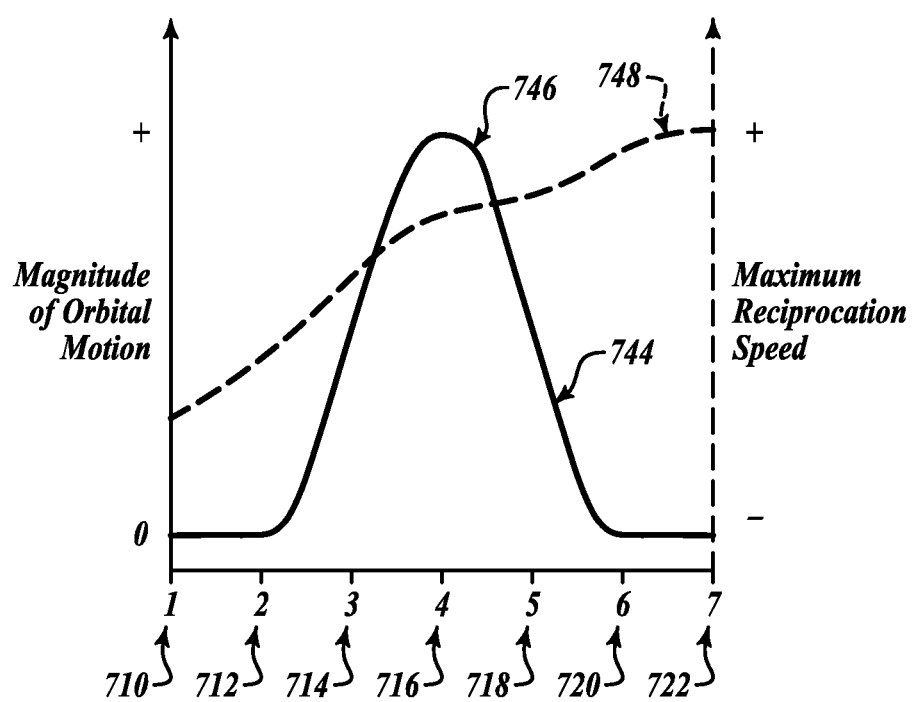
Figure 13:
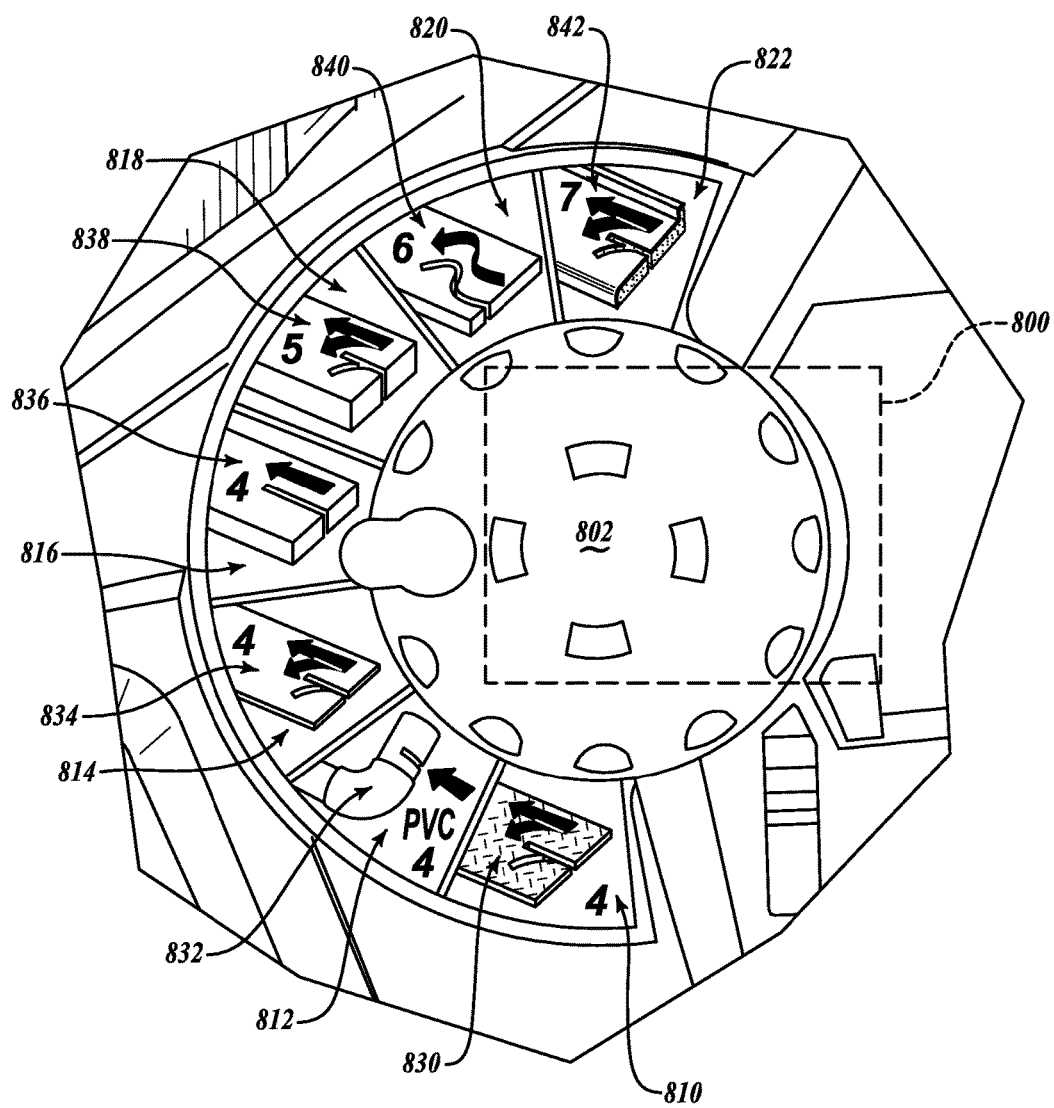

FIG. 12 is a diagram showing an exemplary relationship between a value of reciprocation speed and a value of the magnitude of orbital motion at each of the positions of the single control member corresponding to the icons of FIG. 11 in accordance with the present teachings FIG. 13 is similar to FIG. 11 and shows icons attached to a fascia and adjacent to a single control member in accordance with the present teachings.

Figure 14:
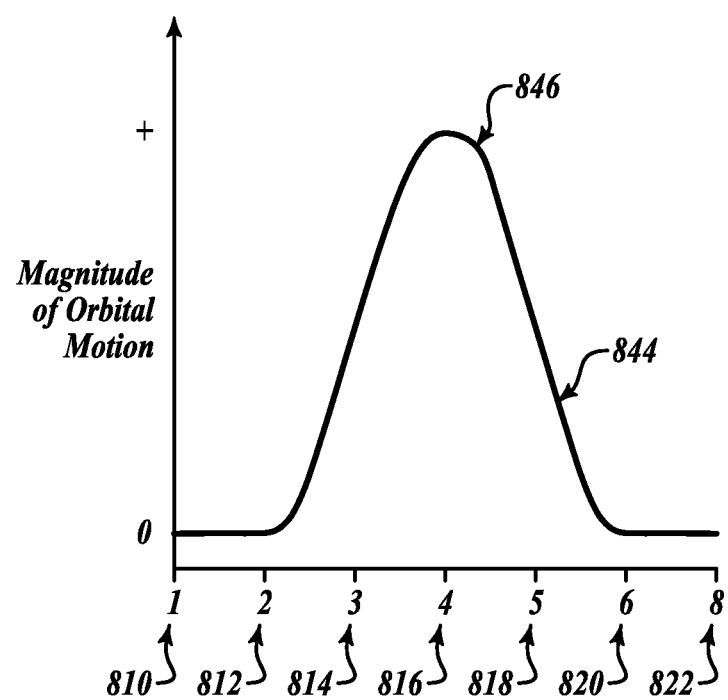

FIG. 14 is a diagram showing an exemplary relationship of magnitude of orbital motion at each of the positions of the single control member corresponding to the icons of FIG. 13 in accordance with the present teachings.

DETAILED DESCRIPTION

The following description is merely exemplary in nature and is not intended to limit the present teachings, their application or uses. It should be understood that throughout the drawings, corresponding reference numerals can indicate like or corresponding parts and features.

Moreover, certain terminology can be used for the purpose of reference only and do not limit the present teachings. For example, terms such as "upper," "lower," "above" and "below" can refer to directions in the drawings to which reference is made. Terms such as "front," "back," "rear" and "side" can describe the orientation of portions of the component, function, system, etc. within a consistent but arbitrary frame of reference which can be made more clear by reference to the text and the associated drawings describing the component, function, system, etc. under discussion. Such terminology may include the words specifically mentioned above, derivatives thereof and words of similar import. Similarly, the terms "first," "second" and other such numerical terms referring to structures, systems and/or methods do not imply a sequence or order unless clearly indicated by the context.

Figure 1:
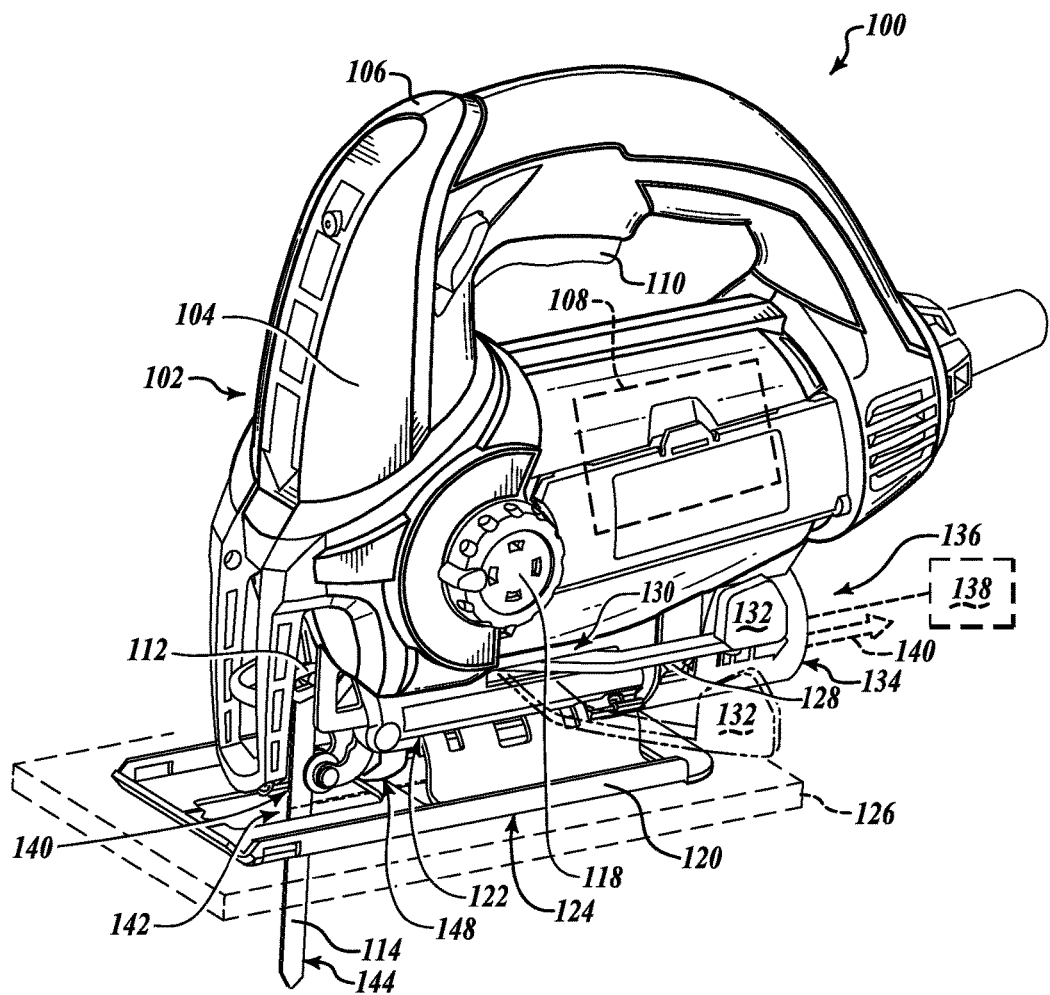
FIG. 1 is a perspective view of an example of a jigsaw having a dust extraction airflow through the housing and a single control member in accordance with the present teachings.

With reference to FIG. 1, a jigsaw 100 generally includes a housing 102 that can be formed of two half shells 104, 106.

Figure 4:
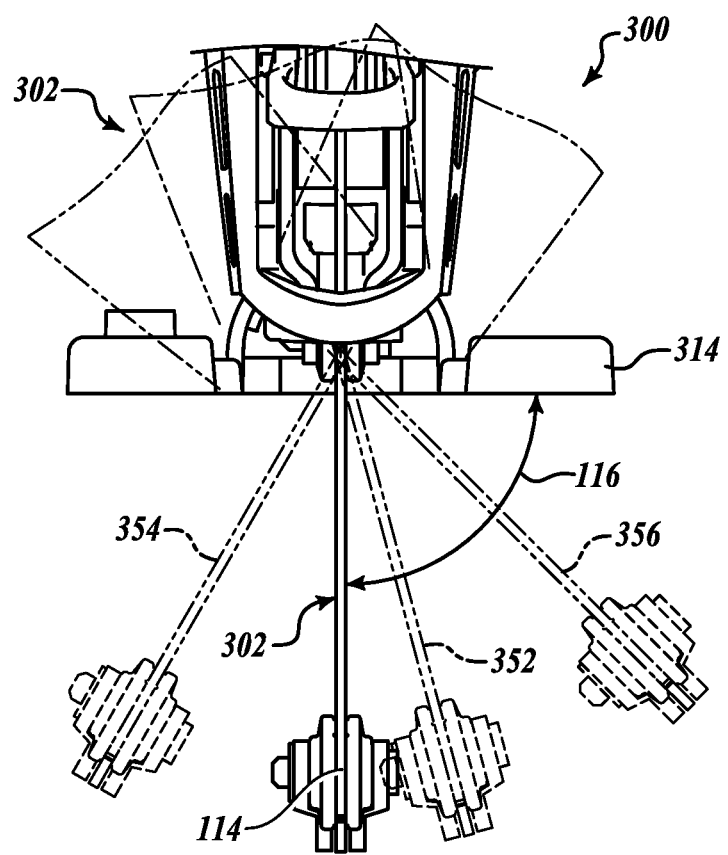
FIG. 4 is a partial front view of the jigsaw of FIG. 3 showing a cutting angle at one position selected from a range of possible angular positions in accordance with the present teachings.

The housing 102 can contain a motor 108. When activated by a trigger assembly 110, the motor 108 can provide a reciprocating and/or orbital motion to a reciprocating shaft 112 to drive a cutting blade 114 at a cutting angle 116 (FIG. 4). A user can use a single control member 118 on a side of the housing 102 to control a reciprocation speed and/or a magnitude of orbital (pendulum) motion of the reciprocating shaft 112 by moving the single control member 118 between a plurality of user selectable positions discussed further below.

A shoe member 120 can be coupled to a bottom 122 of the housing 102 in such a way as to permit the shoe member 120 to pivot relative to the housing 102. As the shoe member 120 pivots relative to the housing 102, the cutting blade 114 can be orientated at various angles (i.e., one or more of the cutting angles 116 (FIG. 4)) relative to the shoe member 120.

A bottom surface 124 of the shoe member 120 can abut a workpiece 126, which can be wood, plastic, metal, other suitable materials and one or more combinations thereof and can be in the form of pipe, sheet material, stock material, other suitable forms and/or materials and one or more combinations thereof. The shoe member 120 can be pivoted relative to the housing 102 to adjust the cutting angle 116 (FIG. 4) of the jigsaw 100. As the shoe member 120 is moved relative to the housing 102, an angle indicator wheel 128 can indicate the cutting angle 116 of the jigsaw 100.

Further, a locking mechanism 130 can include a bevel lever 132 that can be adjusted between an unlocked condition (in phantom) and a locked condition, as shown in FIG. 1. In the unlocked condition, the locking mechanism 130 can permit the shoe member 120 to pivot relative to the housing 102 as shown in FIG. 4. In the locked condition, the locking mechanism 130 can prevent the shoe member 120 from pivoting relative to the housing 102.

A dust extraction port 134 can be formed on a rear portion 136 of the housing 102 such that a vacuum source 138 can be connected with various suitable connections to the dust extraction port 134. A dust extraction airflow 140 can be extracted from a cutting area 142. From the cutting area 142, the dust extraction airflow 140 can move into the housing 102 near a rear edge 144 of the cutting blade 114, through an airflow pathway in the housing 102 and out through the dust extraction port 134.

The dust extraction airflow 140 can travel through the housing 102 and can be routed through an inner periphery of the angle indicator wheel 128. The dust extraction airflow 140 can exit the cutting area 142 through a scoop member 148 that can extend from the housing 102. In the above examples, the shoe member 120 can be pivoted relative to the housing 102 without interrupting the dust extraction airflow 140 through the housing 102 and through the angle indicator wheel 128.

Figure 2:
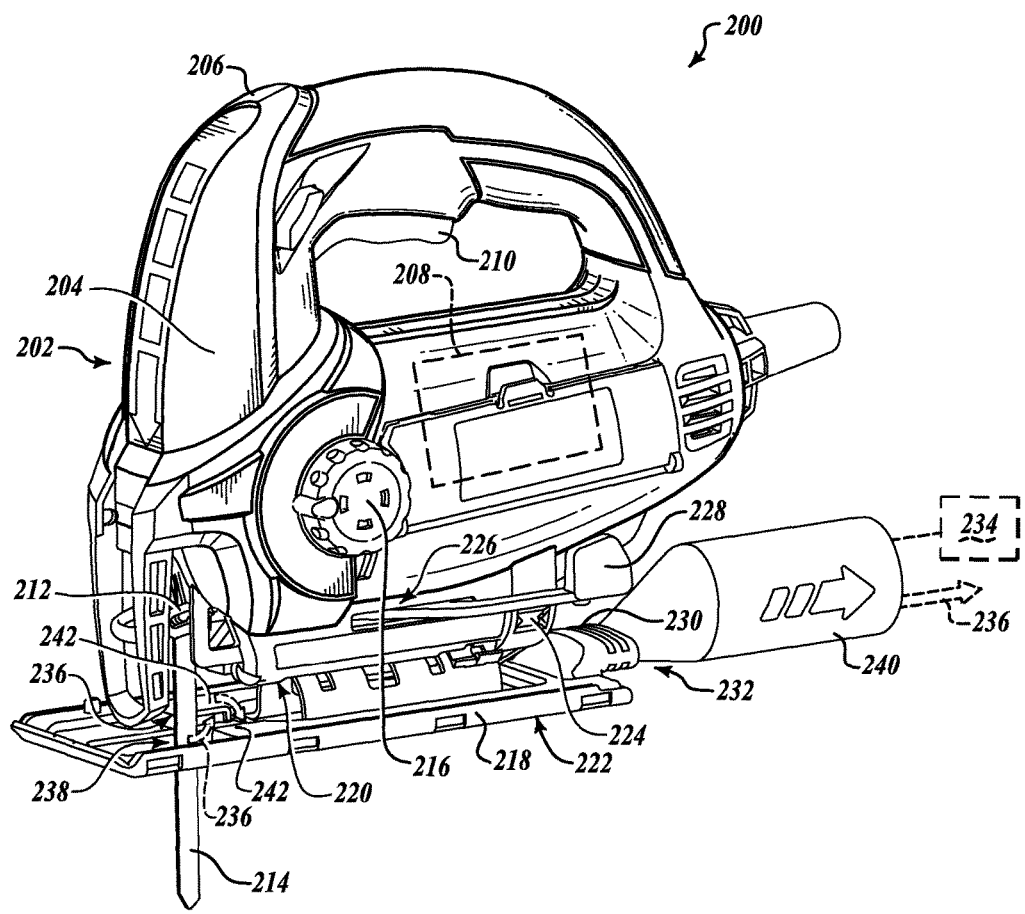
FIG. 2 is a perspective view of another example of a jigsaw having a single control member and a dust extraction airflow through a shoe member in accordance with the present teachings.

With reference to FIG. 2, a jigsaw 200 includes a housing 202 that can be formed of two half shells 204, 206. The housing 202 can contain a motor 208. When activated by a trigger assembly 210, the motor 208 can provide a reciprocating and/or orbital motion to the reciprocating shaft 212 to drive a cutting blade 214 at one or more of the cutting angles 116 (FIG. 4). A single control member 216 on a side of the housing 202 can control the reciprocation speed and/or the magnitude of orbital motion of the cutting blade 214.

A shoe member 218 can be coupled to a bottom 220 of the housing 202 in such a way as to permit the shoe member 218 to pivot relative to the housing 202. As the shoe member 218 pivots relative to the housing 202, the cutting blade 214 can be orientated at the various cutting angles 116 (FIG. 4) relative to the shoe member 218. A bottom surface 222 of the shoe member 218 can abut the workpiece 126 (FIG. 1).

As the shoe member 218 is moved relative to the housing 202, an angle indicator wheel 224 can indicate the cutting angle 116 (FIG. 4) of the jigsaw 200. Further, a locking mechanism 226 can include a bevel lever 228 that can be adjusted between an unlocked condition (FIG. 1) and a locked condition. The cutting angle 116 to which the shoe member 218 can be pivoted relative to the housing 202, when the locking mechanism 226 is in the unlocked condition, can be indicated by the angle indicator wheel 224.

A dust extraction port 230 can be formed on a rear portion 232 of the shoe member 218, in contrast to the dust extraction airflow 140 through the housing 102 (FIG. 1). A vacuum source 234 can be connected to the dust extraction port 230. A dust extraction airflow 236 can be extracted from a cutting area 238. From the cutting area 238, the dust extraction airflow 236 can move through an airflow pathway in the shoe member 218 and out through the dust extraction port 230 that extends therefrom. A vacuum source adapter 240 can be connected to the dust extraction port 230 formed in the shoe member 218 and can be used to connect to the vacuum source 234. Inlets 242 can be formed at one or more locations on the shoe member 218 adjacent the cutting area 238. From the inlets 242, the dust extraction airflow 236 can be routed through channels in the shoe member 218 that can establish the airflow pathway and routed out to the dust extraction port 230.

Figure 3:
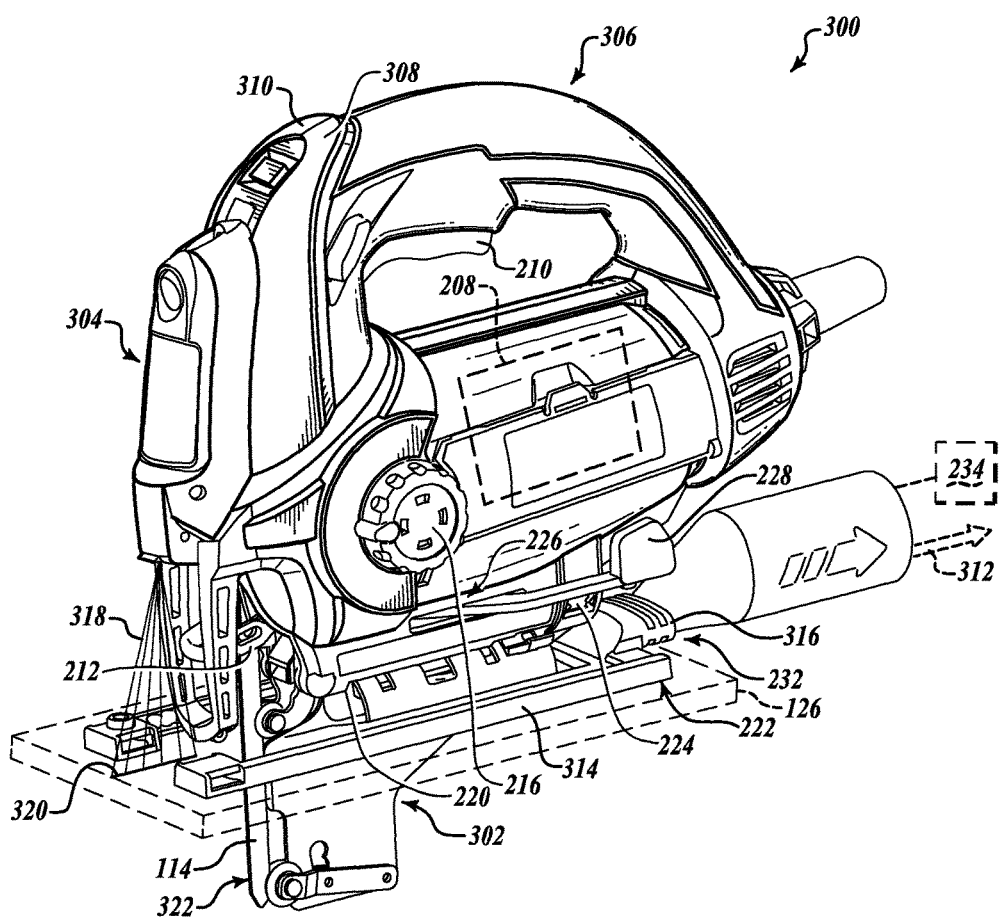
FIG. 3 is a perspective view of a further example of a jigsaw similar to the jigsaw of FIG. 2 and includes a keel assembly connected to a bottom of the housing in accordance with the present teachings.

With reference to FIG. 3, a jigsaw 300 can be similar to the exemplary jigsaw 200 (FIG. 2) and can also include a keel assembly 302 and/or a laser module 304 that can be connected to a housing 306 having two housing half shells 308, 310 implemented in a similar fashion to the jigsaw 200. The jigsaw 300 can further include a dust extraction airflow 312 through a shoe member 314. The dust extraction airflow 312 can exit from a dust extraction port 316 that can extend therefrom. The laser module 304 can project a laser light 318 and can produce a laser light pattern 320. The keel assembly 302 can provide additional straight-line accuracy when cutting a straight line in the workpiece 126 (e.g., can help avoid wandering of the jigsaw cutting line). The keel assembly 302 can be pivoted with the housing 306 when the shoe member 314 is moved at an angle (i.e., one or more cutting angles 116 (FIG. 4)) relative to the housing 306.

With reference to FIG. 4, the cutting angle 116 of the cutting blade 114 of the jigsaw 300 is shown relative to the shoe member 314 of the jigsaw 300. The keel assembly 302 can also be attached to the housing 306. The cutting angle 116 can be positioned at a zero degree cutting angle, i.e., a perpendicular cutting angle relative to the shoe member 314. The cutting angle 116 can also be positioned at one or more cutting angles such as a cutting angle 352 (phantom line) that can be positioned at about positive fifteen degrees, while a cutting angle 354 (phantom line) can be positioned at about negative thirty degrees. A cutting angle 356 (phantom line) can be positioned at about positive forty five degrees. It will be appreciated in light of the disclosure that various cutting angles can be implemented with any of the jigsaws 100, 200, 300 (FIGS. 1, 2 and 3).

Figure 5:
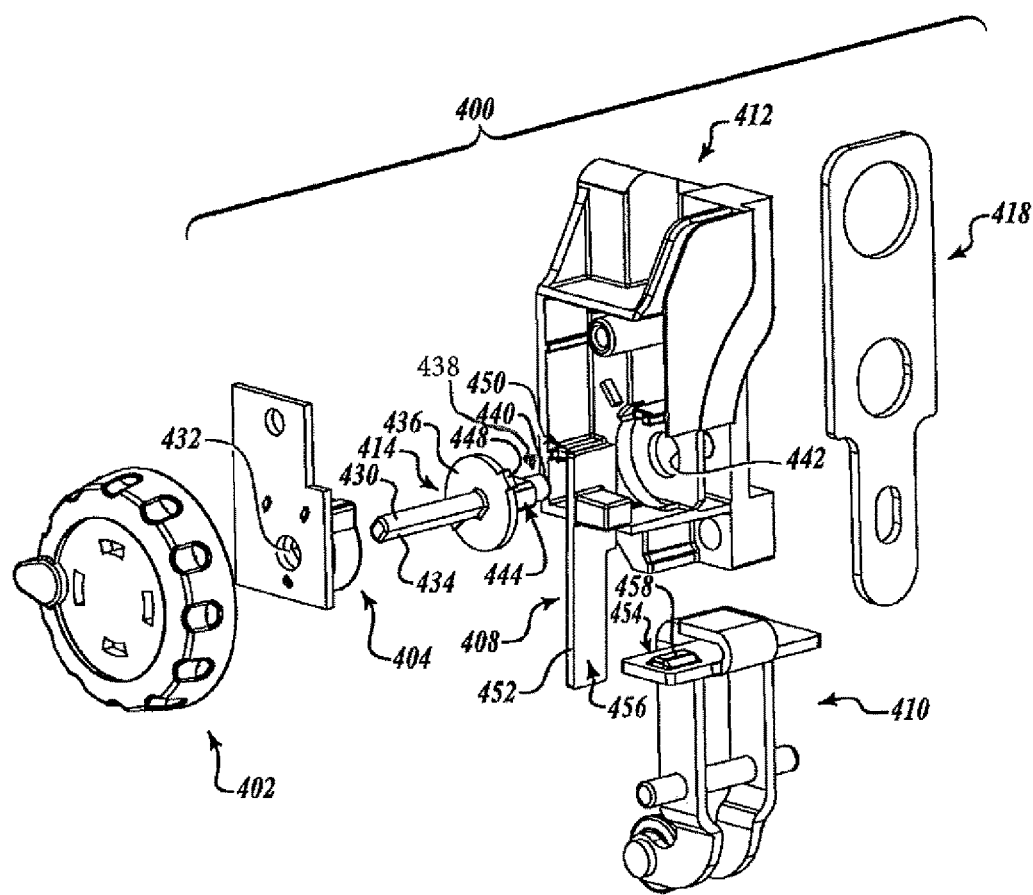
FIG. 5 is an exploded assembly view of an exemplary jigsaw control assembly that can control a reciprocation speed and a magnitude of orbital motion of a reciprocating shaft with a single control member in accordance with the present teachings.

With reference to FIG. 5, a jigsaw reciprocation speed and orbital magnitude control assembly 400 can include a single control member 402 that can connect to a reciprocation speed control module 404. The control module 404 can control the reciprocation speed of a jigsaw 406. The jigsaw 406 can be similar to any one of the jigsaws 100, 200, 300 (FIGS. 1, 2 and 3) and/or other suitable cutting tools. The single control member 402 can also connect to an orbital adjuster member 408 that can limit the travel of a roller carrier assembly 410 to control the magnitude of orbital motion of the jigsaw 406.

Figure 6:
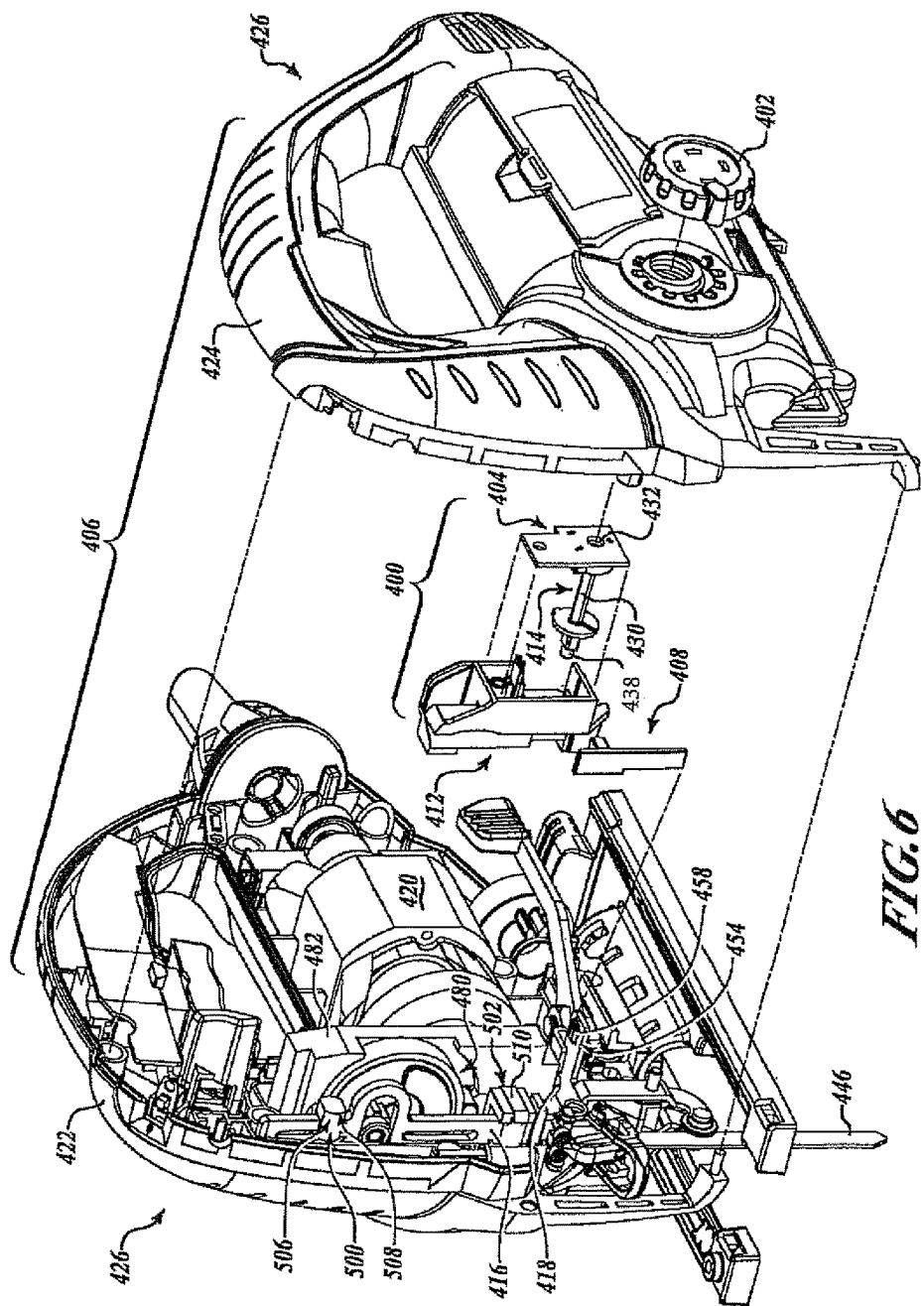
FIG. 6 is an exploded assembly view of the jigsaw of FIG. 2 showing the jigsaw control assembly of FIG. 5 disposed relative to half shells of a housing of the jigsaw in accordance with the present teachings.
Figure 7:
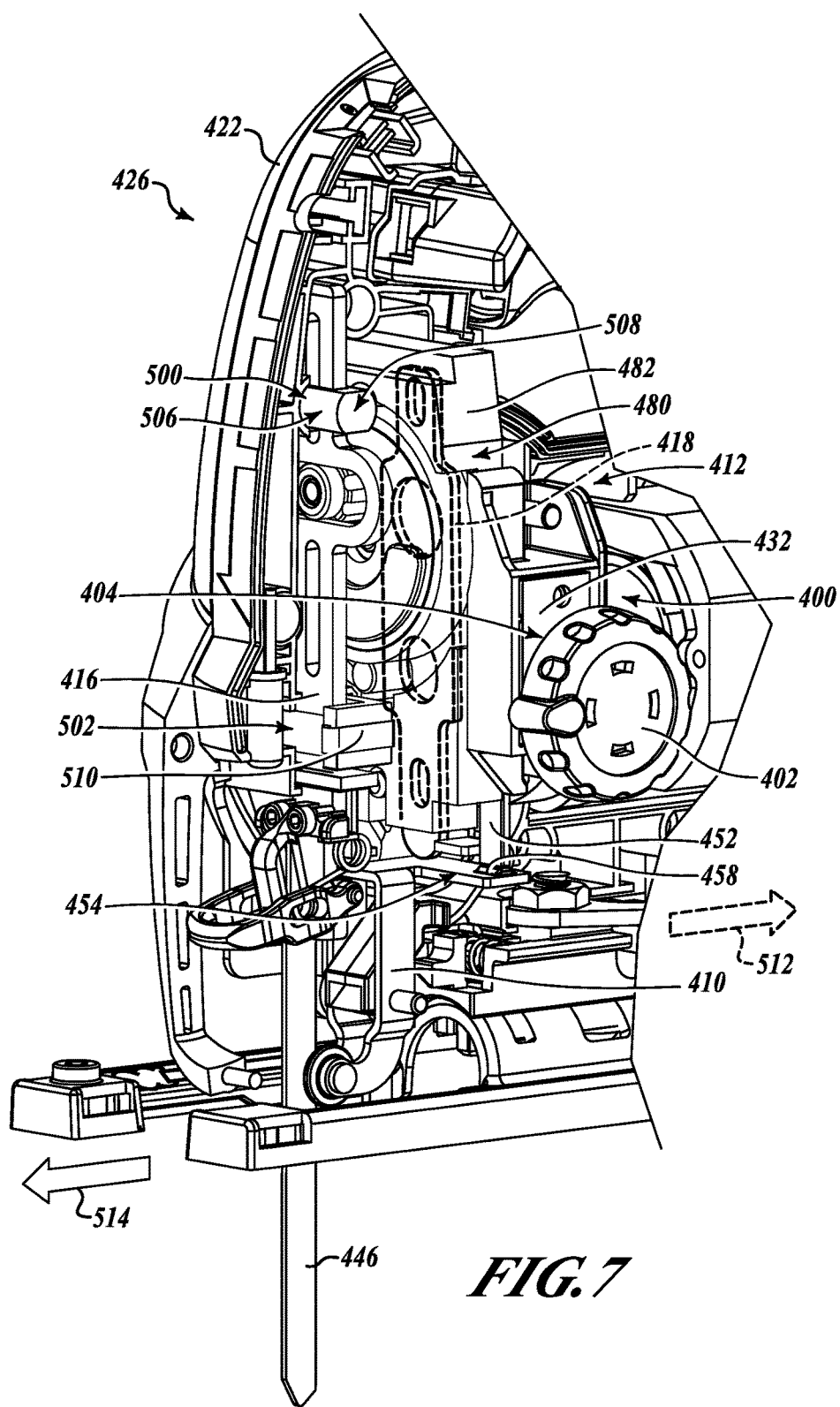
FIG. 7 is a partial cross-sectional view of the jigsaw of FIG. 2 showing the control assembly of FIG. 5 disposed within the housing in accordance with the present teachings.

With reference to FIGS. 6 and 7, the jigsaw control assembly 400 can include a control assembly housing 412 that can contain or connect to each of the individual components of the jigsaw control assembly 400. The jigsaw control assembly 400 can include the control module 404, a shaft member 414 to which the control member 402 is attached and the orbital adjuster member 408. The orbital adjuster member 408 can move in response to rotation of the single control member 402. In addition, the housing 412 of the control assembly 400 can be situated between a reciprocating shaft 416 and a driver member 418 that can both reciprocate in response to a rotational output from a motor 420 contained within half shells 422, 424 of a housing 426 of the jigsaw 406.

Figure 8:
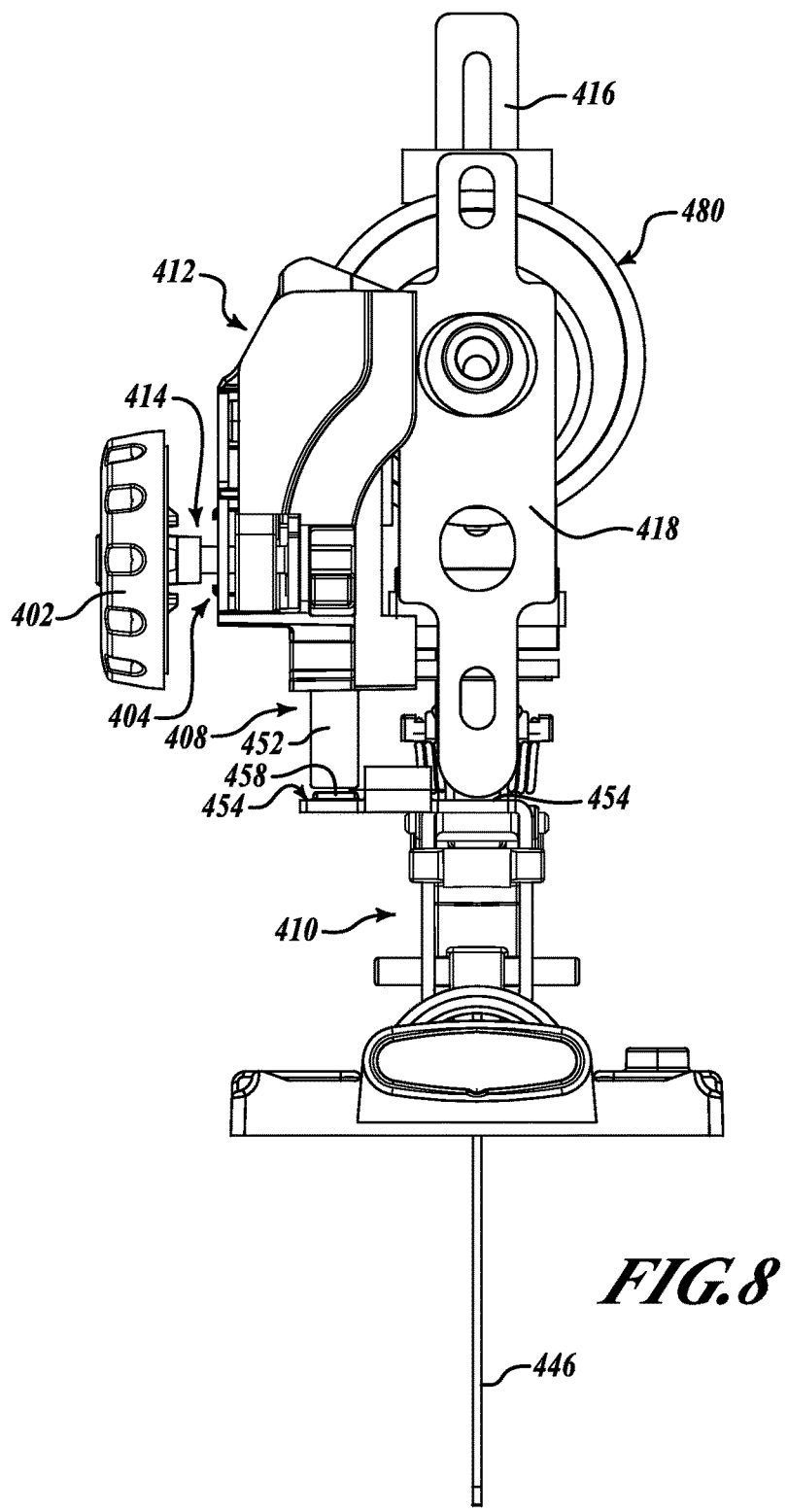
FIG. 8 is a simplified partial rear view of a portion of the jigsaw of FIG. 2 showing a driver member, an eccentric gear mechanism and the jigsaw control assembly of FIG. 5 in accordance with the present teachings.

With reference to FIG. 5, the shaft member 414 can have a first portion 430 that can be inserted through an aperture 432 in the control module 404. The shaft member 414 can ultimately connect to the single control member 402. The first portion 430 of the shaft member 414 can terminate at an end 434 that can be contained within the single control member 402, as shown in FIG. 8. The first portion 430 can extend from an annular flange 436 that can (or need not) butt up against the control module 404.

A second portion 438 of the shaft member 414 can extend in an opposite direction from the first portion 430 and can terminate in an end 440. The end 440 of the shaft member 414 can be received within an aperture 442 of the control assembly housing 412. Between the end 440 and the annular flange 436, a protrusion having a cam surface 444 can extend from the second portion 438 of the shaft member 414. The cam surface 444, when rotated with the shaft member 414, can urge the orbital adjuster member 408 away from the shaft member 414 so as to adjust the magnitude of orbital motion of the roller carrier assembly 410 and thus a cutting blade 446 (FIG. 7). A stop member 448 can extend from the annular flange 436 and can limit the range and/or number of rotational positions that the user can select with the single control member 402.

The orbital adjuster member 408 can have a groove portion 450 that can receive the cam surface 444 of the shaft member 414. The orbital adjuster member 408 can further define an extension portion 452 that can extend below the jigsaw control assembly housing 412 and can make contact with a top surface 454 of the roller carrier assembly 410. As the single control member 402 is moved between the user selectable positions, the cam surface 444 can urge the orbital adjuster member 408 into different locations that can each obstruct the interaction between the driver member 418 and the roller carrier member 410 to a greater or lesser degree.

In one example, as the cam surface 444 moves in response to rotation of the single control member 402, a surface 456 on the orbital adjuster member 408 can be urged further against a protrusion 458 formed on the top surface 454 of the roller carrier assembly 410. In doing so, the orbital adjuster member 408 can hold the roller carrier assembly 410 farther away from (or closer to) the driver member 418. In one example, the orbital adjuster member 408 can be positioned so that the roller carrier assembly 410 can be held sufficiently far from the driver member 418 so that the driver member 418 does not contact the roller carrier assembly 410 at any point during the movement of the driver member 418. In this regard, no orbital motion is imparted and the magnitude of orbital motion is zero.

With reference to FIGS. 6 and 7, the motor 420 can drive an eccentric mechanism 480 that can move the driver member 418 in a reciprocating motion and contact the top surface 454 on the roller carrier assembly 410. Without any obstruction from the orbital adjuster member 408, the driver member 418 can strike the roller carrier assembly 410 to provide, for example, a first range of orbital motion. As the single control member 402 is rotated and the orbital adjuster member 408 can push the roller carrier assembly 410 farther away from contact with the movement of the driver member 418, the magnitude of the orbital motion can be reduced.

It will be appreciated in light of the disclosure that the single control member 402 can be rotated to urge the orbital adjuster member 408 into such a position as to urge the roller carrier assembly 410 completely out of contact with the driver member 418 so as to remove any orbital motion. It will further be appreciated in light of the disclosure that there can be a plurality of positions between the position of the single control member 402 that provides full orbital motion (i.e., the greatest magnitude of orbital motion) and a position that provides no (or little) orbital motion. In one example, the greatest magnitude of orbital motion can be established when the orbital adjuster member 408 does not contact the roller carrier assembly 410 at all. In other aspects, the greatest magnitude of orbital motion can be established when the orbital adjuster member 408 can hold the roller carrier assembly 410 away from the movement of the driver member 418 the least compared to other user selectable positions of the single control member 402.

With reference to FIG. 6, the motor 420 can attach to a motor block 482 that can hold the eccentric mechanism 480. The reciprocating shaft 416 and the driver member 418 can be contained within the housing 426 and can be restrained so that the eccentric mechanism 480 is able to convert the rotational output of the motor 420 into the reciprocating motion of the reciprocating shaft 416 and/or the driver member 418. The reciprocating shaft 416, however, can pivot between a forward position and a backward position within the housing 426, which can, in turn, provide the orbital motion of the cutting blade 446.

More specifically, the reciprocating shaft 416 can travel between a top bearing member 500 and a bottom bearing member 502. The top bearing member 500 can have an outer surface 506 that can have a partial circular shape 508 to permit the reciprocating shaft 416 to pivot about the top bearing member 500. With reference to FIG. 7, the bottom bearing member 502 can include a spring 510 that can bias the reciprocating shaft 416 in a direction 512 that can be opposite a cutting direction 514. The reciprocating shaft 416 can, therefore, be permitted to pivot about the top bearing member 500, while the reciprocating shaft 416 can be urged in a direction against the bias of the spring 510 that is in (or connected to) the bottom bearing member 502.

In various aspects of the present teachings, the orbital motion can draw the cutting blade 446 closer to the cutting area 142 (FIG. 1) of the workpiece 126 (FIG. 1) as the cutting blade 446 is drawn upward. As the cutting blade 446 is pushed downward, the spring 510 in the bottom bearing 502 can push the cutting blade 446 toward the direction 512 and further from the cutting area 142 in the workpiece 126. By urging the cutting blade 446 away from the cutting area 142 on the downward stroke, the cutting blade 446 can be shown to clear debris, etc. from the cutting area 142 on the workpiece 126. On the upstroke, the driver member 418 can contact the roller carrier assembly 410 to again urge the cutting blade 446 to re-engage and cut the workpiece 126. It will be appreciated in light of this disclosure, that the cutting blade 446 can be configured to cut on the upstroke. In other examples, the cutting blade can be configured to cut on the downstroke and the magnitude of orbital motion in combination with the reciprocation speed of the cutting blade 446 of the jigsaw can be configured accordingly.

Figure 9:
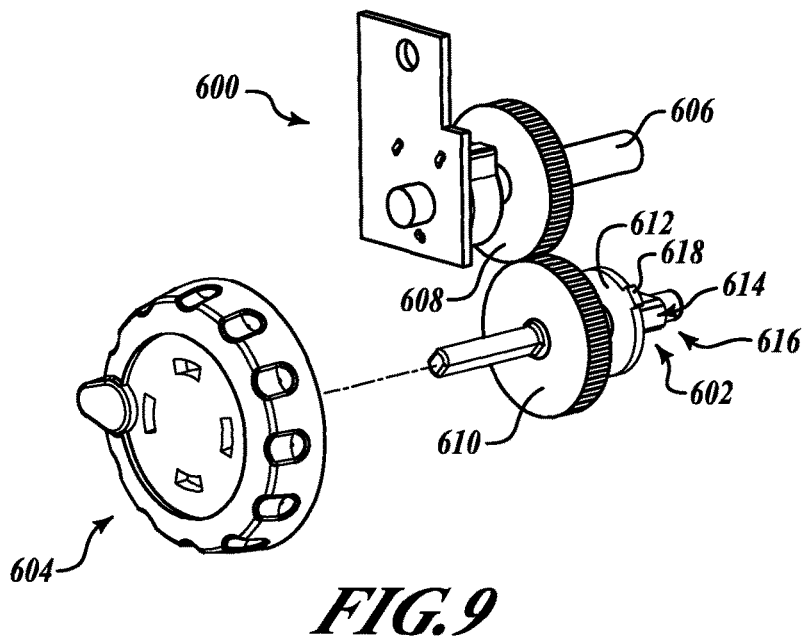
FIG. 9 is a simplified perspective view of a single control member that controls the reciprocation speed and the magnitude of orbital motion of a jigsaw and a first shaft member that connects to but is not coaxial with a second shaft member that extends through a control module that controls reciprocation speed in accordance with further aspects of the present teachings.
Figure 10:
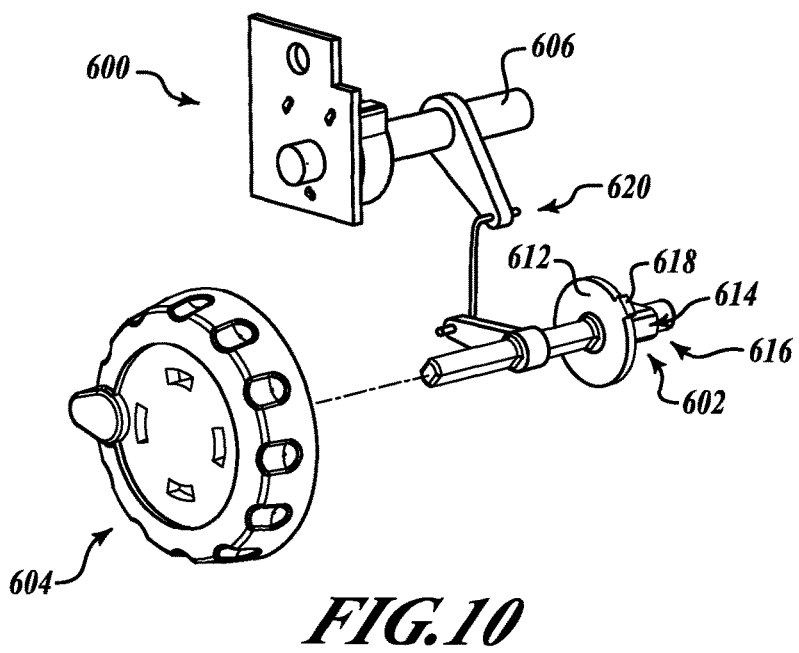
FIG. 10 is similar to FIG. 9 and shows a linkage mechanism that connects the first shaft member connected to the single control member to the second shaft member that connects to the reciprocation speed control module in accordance with the present teachings.

With reference to FIGS. 9 and 10, a control module 600 that controls reciprocation speed can be configured so as to not be co-axial with a second shaft member 602 that can connect to a single control member 604. With reference to FIG. 9, a first shaft member 606 can connect to the control module 600. The shaft member 606 can include a gear portion 608 that can mesh with a gear portion 610 on the shaft member 602 that can connect to the single control member 604. Via the meshing of the gear portions 608, 610, the single control member 604 can control reciprocation speed and/or the magnitude of orbital motion.

Similar to the shaft member 414 (FIG. 5), the second shaft member 602 can include an annular flange 612 and a cam surface 614 that can extend from a portion 616 of the second shaft member 602. The cam surface 614, when rotated, can urge an orbital adjuster member 408 (FIG. 5) away from the shaft member 602. A stop member 618 that can extend from the annular flange 612 can limit the range and/or number of rotational positions that the user can select with the single control member 604.

With reference to FIG. 10, a linkage mechanism 620 can be implemented in lieu of the meshing gear portions 608, 610 (FIG. 9). The linkage mechanism 620 can connect the first shaft member 606 that can connect to the control module 600 to the second shaft member 602 that can connect to the single control member 604, which can ultimately control reciprocation speed and magnitude of the orbital motion of the cutting blade 446 (FIG. 7).

In one example and with reference to FIG. 11, a jigsaw control assembly 700 can be configured to provide seven different user selectable positions of a single control member 702 that can correlate with seven different specific combinations of the value of the magnitude of orbital motion and the value of the reciprocation speed. Each of the seven different user selectable positions can each correspond to each of seven graphic icons that can be descriptive of specific tasks and/or materials on which the jigsaw 406 (FIG. 6) can be used at the specific combination of the value of the magnitude of orbital motion and the value of the reciprocation speed.

In one example, a first position 710 can be associated with a first icon 730. A second position 712 can be associated with a second icon 732. A third position 714 can be associated with a third icon 734. A fourth position 716 can be associated with a fourth icon 736. A fifth position 718 can be associated with a fifth icon 738. A sixth position 720 can be associated with a sixth icon 740. A seventh position 722 can be associated with a seventh icon 742. It will be appreciated in light of the disclosure that more or less positions and associated icons can be implemented with the jigsaw control assembly 700. The user can, therefore, select the specific combination of the value 744 (FIG. 12) of the magnitude of the orbital motion and the value 748 (FIG. 12) of the maximum reciprocation speed by directing the single control member 702 to one of the icons 730, 732, 734, 736, 738, 740, 742 without the need to specifically determine and set the value of the magnitude of orbital motion and the value of the reciprocation speed.

By way of the above example and with reference to FIGS. 11 and 12, the first position 710 with the first icon 730 can be associated with the slowest reciprocation speed (e.g., about eight hundred strokes per minute) and no (or little) orbital motion. The second position 712 with the second icon 732 can be associated with an increased but second slowest reciprocation speed (e.g., about one thousand seven hundred strokes per minute) and no (or little) orbital motion. This combination of reciprocation speed and orbital motion can be used, for example, with sheet metal, tin plate, ceramic tile, fiberglass sheet, etc. In addition, a metal, ceramic or fiberglass cutting blade can be used. The second icon 732 can be descriptive of a metal plate through which a straight and/or curved cut can be made.

The third position 714 with the third icon 734 can be associated with an increased but third slowest reciprocation speed (e.g., about two thousand three hundred strokes per minute) and moderate orbital motion. This combination of reciprocation speed and orbital motion can be used, for example, with plastics, PERSPEX®, poly-vinyl chloride, etc. In addition, various general purpose cutting blades can be used. The third icon 734 can be descriptive of a poly-vinyl chloride pipe through which a straight cut can be made.

The fourth position 716 with the fourth icon 736 can be associated with an increased maximum reciprocation speed (e.g., about three thousand strokes per minute) and the maximum magnitude of orbital motion. In the fourth position 716, the reciprocation speed can be the second greatest value of reciprocation speed but the magnitude of orbital motion can have the greatest value 746 (FIG. 12). In this regard, the fourth position 716 and the fifth position 718 can have the second greatest value of reciprocation speed, while the sixth position 720 and the seventh position 722 can have the greatest value of reciprocation speed. Moreover, the fourth position 716 can be the middle position of the single control member 702 relative to the first position 710 and the seventh position 722. This combination of reciprocation speed and magnitude of orbital motion can be used, for example, with general timber, soft wood, fast rip cutting, etc. In addition, various general wood cutting blades can be used. The fourth icon 736 can be descriptive of a wood board through which a straight cut can be made.

The fifth position 718 with the fifth icon 738 can be associated with the second greatest maximum reciprocation speed (e.g., about three thousand strokes per minute) and the moderate magnitude of orbital motion. The moderate magnitude of orbital motion can be a value of the magnitude of orbital motion between no (or little) orbital motion in, for example, the first position 710 and the maximum orbital motion in the fourth position 716. This combination of reciprocation speed and orbital motion can be used, for example, with plywood, wood panels, etc. In addition, various general wood cutting blades can be used. The fifth icon 738 can be descriptive of a plywood board through which a straight and/or curved cut can be made.

The sixth position 720 with the sixth icon 740 can be associated with the greatest maximum reciprocation speed (e.g., about three thousand two hundred strokes per minute) and the no (or little) orbital motion. This combination of reciprocation speed and magnitude of orbital motion can be used, for example, with hardwoods, decking, flooring, etc. and other tasks that can require scrolling, curves and/or other similar craftwork. In addition, various general wood cutting or scrolling wood cutting blades can be used. The sixth icon 740 can be descriptive of a plywood board through which a scroll or curve cut having multiple curves can be made.

The seventh position 722 with the seventh icon 742 can be associated with the greatest value of reciprocation speed (e.g., about three thousand two hundred strokes per minute) and no (or little) orbital motion. This combination of reciprocation speed and of magnitude orbital motion can be used, for example, with kitchen work surfaces, work tops, laminate boards, etc. In addition, various general wood cutting blades can be used. The seventh icon 742 can be descriptive of a laminate surface connected to a wood (or wood material) substrate through which a straight or curve cut can be made.

In one example and with reference to FIG. 13, a jigsaw control assembly 800 can be configured to provide seven different user selectable positions of a single control member 802 that can correlate with seven values 844 (FIG. 14) of the magnitude of orbital motion. Each of the seven different user selectable positions can each correspond to each of seven icons that can be descriptive of specific tasks and/or materials on which the jigsaw 406 (FIG. 6) can be used at the specific value of the magnitude of orbital motion.

Based on the selection of the value of the magnitude of orbital motion, the user can select the value of the reciprocation speed with a separate control. In one example, the user can retract a trigger of a trigger assembly to varying degrees to produce the desired maximum reciprocation speed. In other examples, a separate control (separate from the single control member 802 and the trigger assembly) can be adjusted to produce the desired maximum reciprocation speed, while the trigger of the trigger assembly is retracted to start the reciprocation motion. In the various examples, a soft start mechanism can be employed so that the reciprocation speed gradually increases to a maximum reciprocation speed.

In one example, a first position 810 can be associated with a first icon 830. A second position 812 can be associated with a second icon 832. A third position 814 can be associated with a third icon 834. A fourth position 816 can be associated with a fourth icon 836. A fifth position 818 can be associated with a fifth icon 838. A sixth position 820 can be associated with a sixth icon 840. A seventh position 822 can be associated with a seventh icon 842. It will be appreciated in light of the disclosure that more or less positions and associated icons can be implemented with the jigsaw control assembly 800. The user can, therefore, select the value 844 (FIG. 12) of the magnitude of orbital motion only by referring to one of the icons 830, 832, 834, 836, 838, 840, 842 and positioning the single control member to one of the respective positions 810, 812, 814, 816, 818, 820, 822.

By way of the above example and with reference to FIGS. 13 and 14, the first position 810 with the first icon 830 can be associated with no (or little) orbital motion. This selection of the magnitude of orbital motion can be used, for example, with sheet metal, tin plate, ceramic tile, fiberglass sheet, etc. In addition, a metal, ceramic or fiberglass cutting blade can be used. The first icon 830 can be descriptive of a metal plate through which a straight and/or curved cut can be made.

The second position 812 with the second icon 832 can be associated with no (or little) orbital motion. This selection of the magnitude of orbital motion can be used, for example, with plastics, PLEXIGLAS®, poly-vinyl chloride, etc. In addition, various general purpose or wood cutting blades can be used. The second icon 832 can be descriptive of a poly-vinyl chloride pipe through which a straight cut can be made.

The third position 814 with the third icon 834 can be associated with a moderate magnitude of orbital motion. This selection of the magnitude of orbital motion can be used, for example, with hardwood, decking, flooring, etc. In addition, various wood cutting blades can be used. The third icon 834 can be descriptive of a wood board through which a straight and/or a curved cut can be made.

The fourth position 816 with the fourth icon 836 can be associated with a maximum magnitude 846 of orbital motion. Moreover, the fourth position 816 can be the middle position of the single control member 802 relative to the first position 810 and the seventh position 822. This selection of the magnitude of orbital motion can be used, for example, with general lumber, soft wood, etc. In addition, various general wood cutting blades can be used. The fourth icon 836 can be descriptive of a wood board through which a straight cut can be made.

The fifth position 818 with the fifth icon 838 can be associated with the moderate magnitude of orbital motion. This selection of the magnitude of orbital motion can be used, for example, with plywood, wood panels, etc. In addition, various general wood cutting blades can be used. The fifth icon 838 can be descriptive of a plywood board through which a straight and/or curved cut can be made.

The sixth position 820 with the sixth icon 840 can be associated with no (or little) orbital motion. This selection of the of magnitude orbital motion can be used, for example, with tasks that can require scrolling, curves and/or other similar craftwork. In addition, various general wood cutting or scrolling wood cutting blades can be used. The sixth icon 840 can be descriptive of a plywood board through which a scroll or curve cut having multiple curves can be made.

The seventh position 822 with the seventh icon 842 can be associated with no (or little) orbital motion. This selection of the of magnitude orbital motion can be used, for example, with kitchen work surfaces, work tops, laminate boards, etc. In addition, various general wood cutting blades can be used. The seventh icon 842 can be descriptive of a laminate surface connected to a wood (or wood material) substrate through which a straight or curve cut can be made.

While specific aspects have been described in the specification and illustrated in the drawings, it will be understood by those skilled in the art that various changes can be made and equivalents can be substituted for elements and components thereof without departing from the scope of the present teachings, as defined in the claims. Furthermore, the mixing and matching of features, elements, components and/or functions between various aspects of the present teachings are expressly contemplated herein so that one skilled in the art will appreciate from the present teachings that features, elements, components and/or functions of one aspect of the present teachings can be incorporated into another aspect, as appropriate, unless described otherwise above. Moreover, many modifications may be made to adapt a particular situation, configuration or material to the present teachings without departing from the essential scope thereof. Therefore, it is intended that the present teachings not be limited to the particular aspects illustrated by the drawings and described in the specification as the best mode presently contemplated for carrying out the present teachings, but that the scope of the present teachings include many aspects and examples following within the foregoing description and the appended claims.

What is claimed is:
1. A jigsaw comprising:
a housing containing a motor activated by a trigger assembly;
a single control member connected to the housing and operatively connected to the motor, the single control member configured to be accessible by a user; and
a reciprocating shaft for driving a cutting blade, wherein the reciprocation shaft moves at a reciprocation speed and at a magnitude of orbital motion when said trigger assembly is in a retracted condition, wherein said single control member is operable to be positioned at any one of a plurality of positions, each of said positions corresponds to one of a plurality of predetermined combinations of values of said reciprocation speed and said magnitude of orbital motion, wherein a first one of said predetermined combinations of values at a first one of said plurality of positions includes a first non-zero reciprocation speed and a first non-zero magnitude of orbital motion, and a second one of said predetermined combinations of values at a second one of said plurality of positions includes a second non-zero reciprocation speed different from said first non-zero reciprocation speed and a second non-zero magnitude of orbital motion different from said first non-zero magnitude of orbital motion, wherein movement of the single control member to a selected one of said plurality of positions simultaneously controls said reciprocation speed and said magnitude of orbital motion.

2. The jigsaw of claim 1, further comprising a plurality of icons adjacent to said single control member, wherein each of said icons is at least descriptive of a material to be cut by the jigsaw.

3. The jigsaw of claim 1, further comprising a plurality of icons adjacent to said single control member, wherein each of said icons is at least descriptive of a task to be performed by the jigsaw.

4. The jigsaw of claim 1, further comprising
a control assembly that includes a control module and an orbital adjuster member, wherein said control module adjusts said reciprocation speed and said orbital adjuster member adjusts said magnitude of orbital motion,
a shaft member disposed through said control module, wherein said single control member is coupled to an end of the shaft member,
a roller carrier assembly pivotally connected to said housing, and
a driver member connected to said motor, said driver member reciprocates with said reciprocating shaft and contacts said roller carrier assembly to impart said magnitude of orbital motion, wherein said control assembly is disposed within said housing between said reciprocating shaft and said driver member.

5. The jigsaw of claim 1, wherein said plurality of positions defines an initial position and a last position and positions therebetween including said first and said second ones of said plurality of positions, wherein a value of said magnitude of orbital motion is equal to zero at said initial and said last positions, and wherein a value of said reciprocation speed increases between said initial and said last positions of said plurality of positions.

6. The jigsaw of claim 5, wherein said plurality of positions defines an odd number of positions and said magnitude of orbital motion has a maximum value at a middle position.

7. The jigsaw of claim 1, further comprising
a control assembly that includes a control module and an orbital adjuster member, wherein said control module adjusts said reciprocation speed and said orbital adjuster member adjusts said magnitude of orbital motion,
a shaft member disposed through said control module, wherein said single control member is coupled to an end of the shaft member, and
a protrusion that extends from said shaft member and defines a cam surface that contacts said orbital adjuster member, said protrusion rotatable with said shaft member to adjust said magnitude of orbital motion by moving said orbital adjuster member.

8. The jigsaw of claim 7, further comprising
a roller carrier assembly pivotally connected to said housing, and
a driver member connected to said motor, said driver member reciprocates with said reciprocating shaft and contacts said roller carrier assembly to impart said magnitude of orbital motion, wherein said control assembly is disposed within said housing between said reciprocating shaft and said driver member.

9. The jigsaw of claim 1, further comprising
a control assembly that includes a control module and an orbital adjuster member, wherein said control module adjusts said reciprocation speed and said orbital adjuster member adjusts said magnitude of orbital motion,
a first shaft member disposed through said control module, and
a second shaft member, wherein said single control member is coupled to an end of said second shaft member, a protrusion that extends from said second shaft member and defines a cam surface that contacts said orbital adjuster member, said cam surface rotatable with said second shaft member to adjust said magnitude of orbital motion by moving said orbital adjuster member, wherein said first shaft member connects to said second shaft member with one of meshing gear portions and a linkage mechanism.

10. A jigsaw comprising:
a housing containing a motor activated by a trigger assembly;
a single control member is connected to the housing and operatively connected to the motor, said single control member is configured to be accessible by a user and is operable to be positioned at any one of a plurality of positions;
a reciprocating shaft for driving a cutting blade, wherein the reciprocation shaft moves at a reciprocation speed and at a magnitude of orbital motion when said trigger assembly is in a retracted condition; and
a plurality of icons, wherein each of said icons is associated with each of said positions of said single control member, wherein each of said icons is descriptive of at least one of a material, a task and a combination thereof with which the jigsaw is used and wherein each of said positions of said single control member provides a different one of a plurality of combinations of values of said reciprocation speed and said magnitude of orbital motion of said reciprocating shaft, wherein a first one of said predetermined combinations of values at a first one of said plurality of positions includes a first non-zero reciprocation speed and a first non-zero magnitude of orbital motion, and a second one of said predetermined combinations of values at a second one of said plurality of positions includes a second non-zero reciprocation speed different from said first non-zero reciprocation speed and a second non-zero magnitude of orbital motion different from said first non-zero magnitude of orbital motion, wherein movement of the single control member to a selected one of said icons simultaneously controls said reciprocation speed and said magnitude of orbital motion.

11. The jigsaw of claim 10, further comprising a control assembly that includes a control module and an orbital adjuster member, wherein said control module adjusts said reciprocation speed and said orbital adjuster member adjusts said magnitude of orbital motion, a shaft member disposed through said control module, wherein said single control member is coupled to an end of the shaft member, a roller carrier assembly pivotally connected to said housing, and a driver member connected to said motor, said driver member reciprocates with said reciprocating shaft and contacts said roller carrier assembly to impart said magnitude of orbital motion, wherein said control assembly is disposed within said housing and situated between said reciprocating shaft and said driver member.

12. The jigsaw of claim 1, wherein said plurality of positions defines an initial position and a last position and positions therebetween including said first and said second ones of said plurality of positions, wherein a value of said magnitude of orbital motion is equal to zero at said initial and said last positions, and wherein a value of said reciprocation speed increases between said initial and said last positions of said plurality of positions.

13. The jigsaw of claim 12, wherein said plurality of positions defines an odd number of positions and said magnitude of orbital motion has a maximum value at a middle position.

14. The jigsaw of claim 10, further comprising a control assembly that includes a control module and an orbital adjuster member, wherein said control module adjusts said reciprocation speed and said orbital adjuster member adjusts said magnitude of orbital motion, a shaft member disposed through said control module, wherein said single control member is coupled to an end of the shaft member, and a protrusion that extends from said shaft member and defines a cam surface that contacts said orbital adjuster member, said cam surface rotatable with said shaft member to adjust said magnitude of orbital motion by moving said orbital adjuster member.

15. The jigsaw of claim 14, further comprising a roller carrier assembly pivotally connected to said housing, and a driver member connected to said motor, said driver member reciprocates with said reciprocating shaft and contacts said roller carrier assembly to impart said magnitude of orbital motion, wherein said control assembly is disposed within said housing between said reciprocating shaft and said driver member.

* * * * *